(12) United States Patent
Ferris

(10) Patent No.: US 11,214,188 B1
(45) Date of Patent: Jan. 4, 2022

(54) DEKHAND

(71) Applicant: Don Ferris, Parkland County (CA)

(72) Inventor: Don Ferris, Parkland County (CA)

( * ) Notice: Subject to any disclaimer, the term of this patent is extended or adjusted under 35 U.S.C. 154(b) by 0 days.

(21) Appl. No.: 16/859,972

(22) Filed: Apr. 27, 2020

(51) Int. Cl.
*B60P 7/13* (2006.01)
*B60P 7/135* (2006.01)

(52) U.S. Cl.
CPC .................................. *B60P 7/135* (2013.01)

(58) Field of Classification Search
CPC . B25D 1/04; B25D 1/00; B25D 1/045; B25D 2250/015; B60P 7/135; B60P 7/0892; B60P 7/15; B60P 7/14; B60P 3/077; B60P 7/0815; B60P 7/12; B60P 3/40; B60P 7/08
USPC ... 410/121, 94, 129, 143, 122, 150, 155, 89, 410/96, 87, 49, 4, 39; 296/184.1, 193.07, 296/24.34, 24.4, 36, 37.6, 37.8, 41, 51, 296/57.1
See application file for complete search history.

(56) References Cited

U.S. PATENT DOCUMENTS

| | | | |
|---|---|---|---|
| 5,549,429 A | 8/1996 | Sergent | |
| 5,871,204 A | 2/1999 | Spirer | |
| 6,250,181 B1 | 6/2001 | Coonrad | |
| 7,389,971 B2 * | 6/2008 | Gaudreault | B60P 7/0853 16/110.1 |
| 7,409,894 B1 | 8/2008 | Valentine | |
| 8,209,821 B1 * | 7/2012 | Chen | B60P 7/083 24/68 CD |
| 8,641,779 B1 * | 2/2014 | Hollard | A61F 2/7812 623/36 |
| 9,469,239 B2 * | 10/2016 | Armour | B25B 25/00 |

OTHER PUBLICATIONS https://dekhand.com/index.html#top (Year: 2020).*

* cited by examiner

*Primary Examiner* — D Glenn Dayoan
*Assistant Examiner* — Sunsurraye Westbrook

(57) ABSTRACT

An illustrated view of an exemplary dekhand device for securing items while being transported is presented. The dekhand device is ergonomically shaped for easy use. Also, the dekhand device is useful for limiting the number of tools required for securing items. The dekhand device is useful for reducing arm strain. The dekhand device is useful for saving time and effort while increasing security, confidence and public safety.

20 Claims, 3 Drawing Sheets

100

DEKHAND

FIELD OF THE INVENTION

This invention relates to moving of items of any size and shape. More particularly, it relates to the securement of items of any size and shape while being moved or shipped.

BACKGROUND

A transportation company, removalist or van line is a company that helps people and businesses move their goods from one place to another. It may or may not offer all-inclusive services for relocation like packing, loading, moving, unloading, unpacking or arranging of items to be shipped. Additional services may include office and/or warehousing facilities.

To relocate items of any size or shape, may utilize personal vehicles, rent trucks and/or trailers, or use transportation companies to move their items. The items, such as washers, dryers, lumber, steel, equipment, etc. are often needed to be secured on the beds or inside of trucks and trailers to avoid the items from being damaged, shifting or falling off or from the vehicles.

In light of the foregoing, it would be desirable to devise or improve upon a device to safely secure the items being moved in or on the personal vehicles or in or on the vehicles being rented, or the transportation company being used, to avoid damage to the items being moved or personal or property damage due to an item falling from the transporting vehicle.

DETAILED DESCRIPTION

Figure 1A:
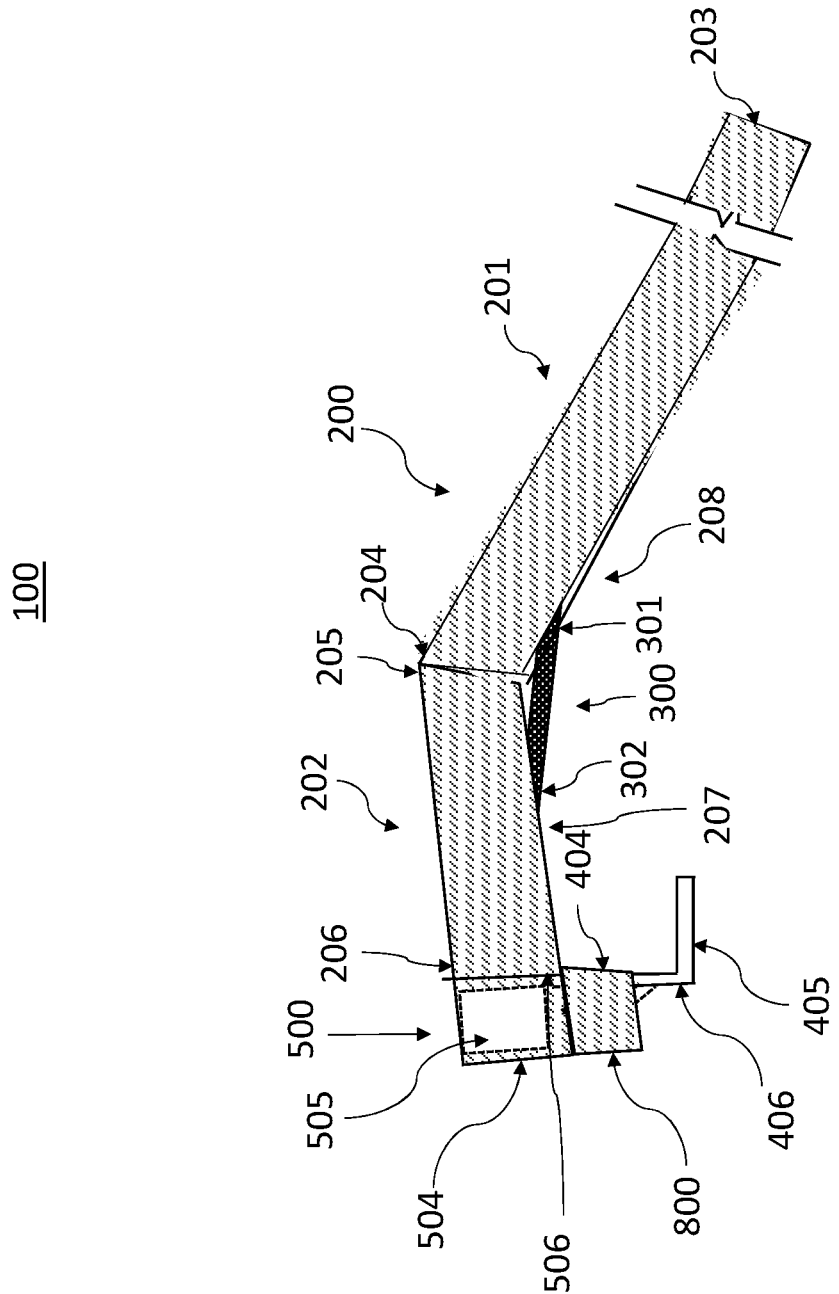
FIG. 1A is an illustrated side view of an exemplary dekhand device.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list.

"Above," "adhesive," "affixing," "any," "around," "both," "bottom," "by," "comprising," "consistent," "customized," "enclosing," "friction," "in," "labeled," "lower," "magnetic," "marked," "new," "nominal," "not," "of," "other," "outside," "outwardly," "particular," "permanently," "preventing," "raised," "respectively," "reversibly," "round," "square," "substantial," "supporting," "surrounded," "surrounding," "threaded," "to," "top," "using," "wherein," "with," or other such descriptors herein are used in their normal yes-or-no sense, not as terms of degree, unless context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Figure 1B:
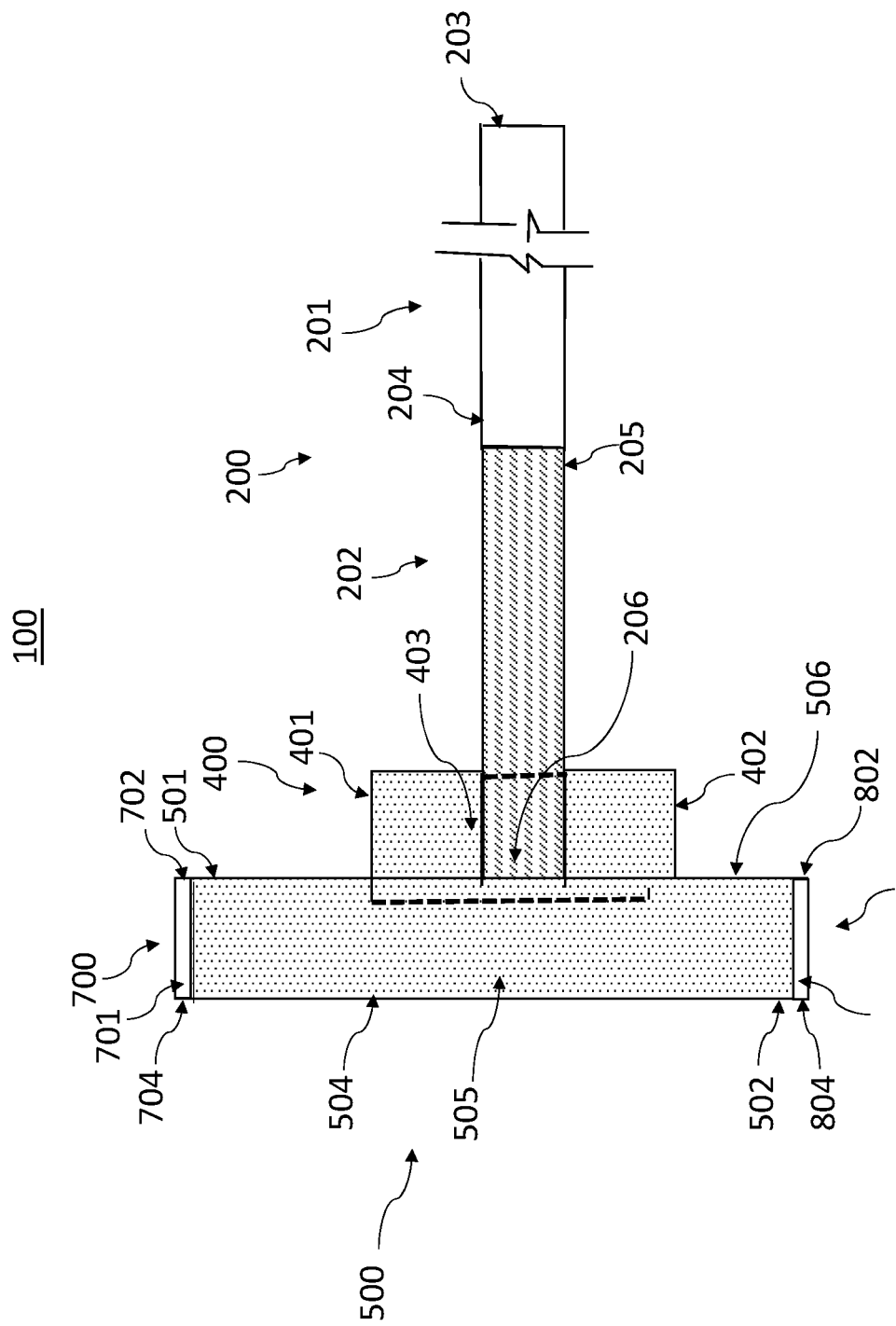
FIG. 1B is an illustrated top view of the exemplary dekhand device shown in FIG. 1A.
Figure 1C:
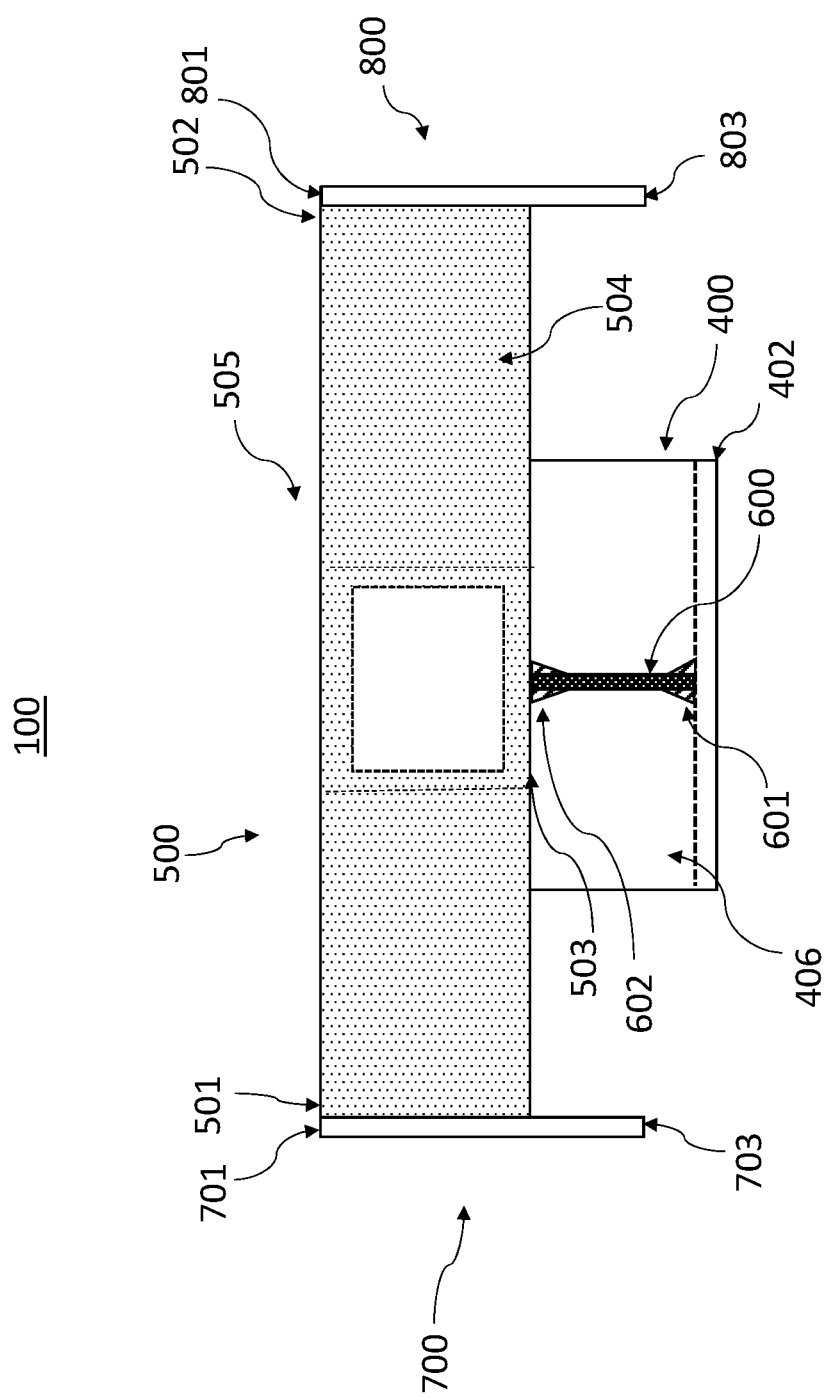
FIG. 1C is an illustrated end view of the exemplary dekhand device shown in FIG. 1A.

Referring to FIG. 1A, FIG. 1B and FIG. 1C, an illustrated view of an exemplary dekhand device 100 for securing items while being transported is presented. The dekhand device 100 may or may not be ergonomically shaped for easy use. Also, the dekhand device 100 is useful for limiting the number of tools required for securing items. The dekhand device 100 is useful for reducing arm strain. The dekhand device 100 is useful for saving time and effort while increasing security, confidence and public safety.

The dekhand device 100 preferably has a length of twenty (20) inches, however other lengths are hereby contemplated, including, but not limited to, nineteen (19) inches, twenty-one (21) inches, etc. The dekhand device 100 preferably has a width of six (6) inches, however other widths are hereby contemplated, including, but not limited to, five (5) inches, seven (7) inches, etc. The dekhand device 100 preferably is made of a steel material, however other materials are hereby contemplated, including, but not limited to, aluminum, wood, plastic, etc.

The dekhand device 100 has a hand arm 200, a first gusset 300, a bottom bar 400, a cross bar 500, a second gusset 600 and two (2) end bars 700, 800.

The hand arm 200 has a first portion 201 and a second portion 202. However, a single one-portion hand arm 200 is hereby contemplated. The first portion 201 has a first end 203 and a second end 204. The first end 203, as shown in FIG. 1A and FIG. 1B, is open, however, optionally and/or additionally, but not limited to, a hammer head, axe head, pry bar, winch bar are hereby contemplated. The first portion 203 of the hand arm 200 is preferably fifteen (15) inches in length, however other lengths are hereby contemplated, including, but not limited to, fourteen (14) inches, sixteen (16) inches, etc. The hand arm 200 preferably has a width of one (1) inch, however other widths are hereby contemplated, including, but not limited to, one-half (½) inch, one and one-half (1½) inches, etc.

The second portion 202 has a first end 205 and a second end 206. The second portion 202 is preferably four (4) inches in length, however other lengths are hereby contemplated, including, but not limited to, three (3) inches, five (5) inches, etc. Longer lengths may or may not eliminate the need for the first portion 201.

The second end 204 of the first portion 201 is securely coupled to the first end 205 of the second portion 202 at an angle. The angle is preferably forty-five degrees (45°), however other angles are hereby contemplated, including, but not limited to, thirty degrees (30°), sixty degrees (60°), Zero degrees (0°) also denoted as straight, etc.

The first gusset 300 has a first end 301 and a second end 302. The first end 301 of the first gusset 300 is securely coupled substantially on the bottom 208 of second end 204 of the first portion 201 of the hand arm 200 by a means necessary depending on the construction material used to make the dekhand device 100. The second end 302 of the first gusset 300 is coupled to a bottom 207 of the first end 205 of the second portion 202 of the hand arm 200 by a means necessary depending on the construction material used to make the dekhand device 100. The first gusset 300 is useful for increasing the strength of the hand arm 200, especially on the larger version of the dekhand device 100 when an angle is used where the first end 205 of the second portion 202 joins the second end 204 of the first portion 201 of the hand arm 200.

The bottom bar 400 has a first end 401, a second end 402, a first side 403, a second side 404 and a middle portion 405. The bottom bar 400 preferably has a thickness of three-sixteenths (3/16) inch, however other thicknesses are hereby contemplated, including, but not limited to, one-eighth (1/8) inch, one-fourth (1/4) inch, etc. The bottom bar 400 preferably has a length being three and one-fourth (3¼) inches, however other lengths are hereby contemplated, including, but not limited to, three (3) inches, four (4) inches, etc.

The bottom bar 400 preferably has an angle of ninety degrees (90°), however other angles are hereby contemplated, including, but not limited to, eighty degrees (80°), one-hundred degrees (100°). The width on both sides of the angle of the bottom bar 400 is preferably one and one-fourth (1.25) inches, however other widths are hereby contemplated, including, but not limited to, one (1) inch, two (2) inches, etc. The second side 404 of the bottom bar 400 is securely coupled to a bottom portion 503 of the cross bar 500 of the dekhand device 100.

The cross bar 500 has a first end 501, a second end 502, a bottom portion 503, a front 504, a top portion 505 and the back portion 506. The cross bar 500 preferably has a length of six (6) inches, however other lengths are hereby contemplated, including, but not limited to, five (5) inches, seven (7) inches, etc. The cross bar 500 preferably has a width of one (1) inch, however other widths are hereby contemplated, including, but not limited to, three-fourths (0.75) inch, two (2) inches, etc. The cross bar 500 preferably has a depth of one (1) inch, however other depths are hereby contemplated, including, but not limited to, three-fourths (0.75) inch, two (2) inches, etc.

The second gusset 600 has a first end 601 and a second end 602. The first end 601 of the second gusset 600 is securely coupled to a third portion 406 of the bottom bar 400 by a means necessary depending on the construction material used to make the dekhand device 100. The second end 602 of the second gusset 600 is securely coupled to the bottom portion 503 of the cross bar 500 by a means necessary depending on the construction material used to make the dekhand device 100. The second gusset 600 is useful for increasing the strength on the larger version of the dekhand device 100. The smaller versions of the dekhand device 100 may or may not require the use of the second gusset 600.

Each of the two end bars 700, 800 has a first end 701, 801, a vertical portion 702, 802, a horizontal portion 703, 803 and a first side 704, 804. The first end 701 of the first side 704 of the vertical portion 702 of the first of the end bars 700 being securely coupled to the first end 501 of the cross bar 500. The first end 801 of the first side 804 of the vertical portion 802 of the second of the end bars 800 being securely coupled to the second end 502 of the cross bar 500.

The vertical portion 702 of the first of the end bars 700 preferably has a length of one and one-half (1.5) inches, however other lengths are hereby contemplated, including, but not limited to, one (1) inch, two (2) inches, etc. The horizontal portion 703 of the first of the end bars 700 preferably has a length of one (1) inch, however other lengths are hereby contemplated, including, but not limited to, three-fourth (0.75) inch, one and one-half (1.5) inches, etc.

The vertical portion 802 of the second of the end bars 800 preferably has a length of one and one-half (1.5) inches, however other lengths are hereby contemplated, including, but not limited to, one (1) inch, two (2) inches, etc. The horizontal portion 803 of the second of the end bars 800 preferably has a length of one (1) inch, however other lengths are hereby contemplated, including, but not limited to, three-fourth (0.75) inch, one and one-half (1.5) inches, etc.

The horizontal portion 703 of the first of the end bars 700 preferably extends a length of one-half (0.5) inch from the bottom of the first end 501 of the bottom portion 503 of the cross bar 500, however other lengths are hereby contemplated, including, but not limited to, one-fourth (0.25) inch, three-fourth (0.75) inch, etc. The horizontal portion 803 of the second of the end bars 800 preferably extends a length of one-half (0.5) inch from the bottom of the first end 502 of the bottom portion 503 of the cross bar 500, however other lengths are hereby contemplated, including, but not limited to, one-fourth (0.25) inch, three-fourth (0.75) inch, etc.

In the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The features described with respect to one embodiment may be applied to other embodiments or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A dekhand device for securing an item when moving the item, the device comprising:
   a hand arm, the arm having first portion and a second portion, wherein the first portion being angled from the second portion;
   a first gusset, a first end of the first gusset being securely coupled significantly near a second end of the first portion, wherein a second end of the first gusset being coupled significantly near a first end of the second portion;
   a bottom bar, the bottom bar having a first end, a second end, a first side and a second side, the first side of the bottom bar being securely coupled to a second end of the second portion of the arm, wherein the bottom bar being angled;
   a cross bar, the cross bar having a top, a bottom, a first end, a second end, a back and a front portion, wherein the middle portion of the bottom of the cross bar being securely coupled to the second end of the second gusset;
   a second gusset, the second gusset having a first end and a second end, wherein the first end being securely coupled to a middle portion of the top of the second side of the bottom bar, and wherein the second end being securely coupled to the middle portion of the bottom of the cross bar; and two end bars, each of the end bars having a first end, a vertical portion, a horizontal portion and a first side, wherein the first end of the first side of the vertical portion of a first of the end bars being securely coupled to the first end of the cross bar, wherein the first end of the first side of the vertical portion of a second of the end bars being securely coupled to the second end of the cross bar, wherein a second end of the vertical portion of the first of the end bars being securely coupled to a first end of the horizontal portion of the first end bar, and wherein a second end of the vertical portion of the second of the end bars being securely coupled to a first end of the horizontal portion of the second end bar.

2. The device of claim 1, wherein the bottom bar having a width being one and one-fourth (1.25) inches.

3. The device of claim 1, wherein the angle of the bottom bar being ninety degrees (90°).

4. The device of claim 1, wherein the first portion of the hand arm having a length being fifteen (15) inches.

5. The device of claim 1, wherein the second portion of the hand arm having a length being four (4) inches.

6. The device of claim 1, wherein the vertical portion of the first of the end bars having a length being one and one-half (1.5) inches.

7. The device of claim 1, wherein the horizontal portion of the first of the end bars having a length being one (1) inch.

8. The device of claim 1, wherein the vertical portion of the second of the end bars having a length being one and one-half (1.5) inches.

9. The device of claim 1, wherein the horizontal portion of the second of the end bars having a length being one (1) inch.

10. The device of claim 1, wherein the bottom bar having a length being three and one-fourth (3.25) inches.

11. The device of claim 1, wherein the cross bar having a length being six (6) inches.

12. The device of claim 1, wherein device having a length being twenty (20) inches.

13. The device of claim 1, wherein the hand arm having a width being one (1) inch.

14. The device of claim 1, wherein the cross bar having a width being one (1) inch.

15. The device of claim 1, wherein the cross bar having a depth being one (1) inch.

16. The device of claim 1, wherein the second gusset being securely coupled to the cross bar by a means necessary depending on the construction material of the device.

17. The device of claim 1, wherein the second gusset being securely coupled to the bottom bar by a means necessary depending on the construction material of the device.

18. The device of claim 1, wherein the device being made of a steel material.

19. The device of claim 1, wherein the first of the second of the end bars having a length being extended from the bottom of the cross bar being one-half (0.5) inch.

20. The device of claim 1, wherein the second of the second of the end bars having a length being extended from the bottom of the cross bar being one-half (0.5) inch.

* * * * *